United States Patent
Henningfield et al.

(10) Patent No.: US 11,759,734 B1
(45) Date of Patent: Sep. 19, 2023

(54) PORTABLE LIQUID FILTER DEVICES, SYSTEMS AND METHODS

(71) Applicant: PRECISION DEWATERING, LLC, Coral Gables, FL (US)

(72) Inventors: Keith Henningfield, Emery, SD (US); Steven Grice, Eau Claire, WI (US)

(73) Assignee: Precision Dewatering, LLC, Coral Gables, FL (US)

( * ) Notice: Subject to any disclaimer, the term of this patent is extended or adjusted under 35 U.S.C. 154(b) by 0 days.

(21) Appl. No.: 17/166,182

(22) Filed: Feb. 3, 2021

Related U.S. Application Data

(60) Provisional application No. 62/970,762, filed on Feb. 6, 2020.

(51) Int. Cl.
| | |
|---|---|
| *B01D 35/26* | (2006.01) |
| *B01D 29/27* | (2006.01) |
| *B01D 35/30* | (2006.01) |
| *C02F 1/00* | (2023.01) |
| *B01D 29/90* | (2006.01) |
| *C02F 103/00* | (2006.01) |

(52) U.S. Cl.
CPC ............ *B01D 35/26* (2013.01); *B01D 29/27* (2013.01); *B01D 29/902* (2013.01); *B01D 35/301* (2013.01); *C02F 1/001* (2013.01); *B01D 2201/204* (2013.01); *B01D 2201/302* (2013.01); *C02F 2103/007* (2013.01)

(58) Field of Classification Search
CPC ...... B01D 35/26; B01D 35/301; B01D 29/27; B01D 29/902; B01D 2201/204; B01D 2201/302; C02F 1/001; C02F 2103/007
See application file for complete search history.

(56) References Cited

U.S. PATENT DOCUMENTS

| | | | | |
|---|---|---|---|---|
| 3,353,678 A | * | 11/1967 | Dragon | ................. B01D 29/25 210/450 |
| 3,931,015 A | | 1/1976 | Jenkins | |
| 4,133,769 A | | 1/1979 | Morgan, Jr. | |

(Continued)

FOREIGN PATENT DOCUMENTS

EP 2548623 1/2013

OTHER PUBLICATIONS

Rosedale Catalog excerpt (Year: 2014).*

(Continued)

*Primary Examiner* — Liam Royce
(74) *Attorney, Agent, or Firm* — Anthony J. Bourget

(57) ABSTRACT

Methods, devices and systems for treating liquid utilizing an in-line filter having a filter bag positioned within a cage contained in an exit sub-chamber of a housing, the exit sub-chamber isolated from an inlet sub-chamber by a baffle, and an end cap to alternatively seal the inlet sub-chamber so that in one mode the device may function as a screen having an exposed filter bag when the exit end of the device is connected to a suction side of a pump and in another mode as a closed vessel where the end cap is connected to a discharge of a pump or in a further mode where the exit end is connected to a suction side of a pump. The low profile, lightweight, inline filter device provides for versatility and a much needed filter device for two modes of connection to a suction side of a pump while also able to connect to a discharge side of a pump.

19 Claims, 8 Drawing Sheets

(56) References Cited

U.S. PATENT DOCUMENTS

| | | |
|---|---|---|
| 4,390,425 A | 6/1983 | Tafara et al. |
| 5,242,588 A * | 9/1993 | Reese ................ B01D 29/70 55/378 |

OTHER PUBLICATIONS

Filtra Systems, FSCT Single Bag Filter Housings, https://www.fsbagfilter.com/products/fsct-single-bag-filter-housing/, Nov. 4, 2019, Farmington Hills, MI.

GRfiltration, 3ILBFH #2-3 Pod Bag Filtration System, Nov. 4, 2019, Allendale, Ml.

GRFiltration, 2P6BF Dual Pod 6 Bag Filter System, Nov. 4, 2019, Allendale, Ml.

* cited by examiner

PORTABLE LIQUID FILTER DEVICES, SYSTEMS AND METHODS

CROSS-REFERENCE TO RELATED APPLICATIONS

This application claims the benefit of and priority to, U.S. patent application Ser. No. 62/970,762 filed Feb. 6, 2020 for Portable Liquid Filter Devices, Systems and Methods, incorporated herein by reference in its entirety for continuity of disclosure.

BACKGROUND OF THE INVENTION

1. Field of the Invention

This invention relates to the field of filtering devices, systems and methods, and more particularly to devices, systems and methods for filtering of liquids at construction sites and other locations to be dewatered.

2. Background Information

Liquid filters and dewatering systems are utilized in various industrial areas and construction sites. Some dewatering systems are meant to remove liquids such as water from certain areas, for instance from a hole or pond located at a construction site. If rainwater or other liquid happens to fill an area of a construction zone or fill within structures or containers, the unwanted fluid is removed or the area is "dewatered." During a dewatering process particles or unwanted materials or sludge, fines, contaminants or the like are often mixed with the water or fluid. There are rules and regulations on how to handle such removed water so that the particulate matter or contaminants are not introduced or re-introduced into the removed water or sites. The water run-off may be dirty and contain unwanted particulate material or contaminants or pollution. Most jurisdictions have regulations requiring the water to be filtered before it is returned to the location or to nearby waterways. A filter is often used in conjunction with pumping of the water to capture sediment before reintroducing the water into the environment.

There are a variety of filter systems on the market. In some systems a bag will be contained within a housing, and multiple housings can be connected to create a filter system. These filter housings or systems are designed to be used in an upright orientation and have a fixed inlet and a fixed outlet. Examples of some bag filter housings and systems on the market include those such as the 3ILBFH #2-3 Pod Bag Filtration System, and the 2P6BF Dual Pod 6 Bag Filter System sold by GR Filtration of Grand Rapids, Mich., and the FSCT Single Bag Filter Housings sold by Filtra Systems of Farmington Hills, Mich. https://www.fsbagfiller.com/products/fsct-single-bag-filter-housing/. (Such housings and systems are designed to be used in-line with a pump. Some examples of bag filter housings and systems for which patents have been granted include those shown in U.S. Pat. Nos. 3,931,015, 4,133,769, 4,390,425.

While the foregoing attempts to provide effective filtration devices and systems may have certain benefits, there is room for improvement.

SUMMARY OF THE INVENTION

In one aspect the invention pertains to a portable filtration device which is connected for use on either a discharge side or suction side of a pump, and when on the suction side is selectively modified to operate as either a filtering screen or to receive a supply hose.

The disclosure includes a device having a low profile, in-line structure where liquid enters one end and travels horizontally to exit an opposite end. An internal baffle separates inlet and outlet sub-chambers each having a pressure gauge to determine when a bag filter is filled with sediment. The baffle also allows for the device to be selectively modified to operate as a screen when an end cap is removed.

In one aspect the invention pertains to a portable filtration device having a housing defining a chamber, a first end wall positioned at a first end of the housing and having a first opening in communication with the chamber, a baffle positioned at a second end of the housing within the chamber and having a single second opening, the first end wall, housing and baffle defining a sub-chamber; a cage extending from the baffle into the sub-chamber, the cage having perforations to allow liquid to flow therethrough, the cage configured to receive a bag filter therein such that matter contained within liquid introduced through the second opening and into the bag filter is retained as filtrides within the bag filter while filtrate passes through the cage and the first opening.

In a further aspect the invention includes a filter device having an inner baffle supporting a horizontally oriented perforated cage inside a housing chamber where the cage receives a filter bag inside a discharge sub-chamber, an end cap receiving in input of liquid and in part with the baffle defining an inlet sub-chamber. Pressure gauges measure pressure at the sub-chambers to determine when the filter bag needs replacing.

In a further aspect a controller module is provided which monitors the pressure measurement from the gauges and automatically provides a signal when a pre-set pressure differential is met. The signal is used to inform an operator when to replace the filter bag.

In a further aspect the invention includes a method of utilizing a filter device on a discharge side of a pump and alternatively on a suction side of a pump where on the suction side the filter device operates to either receive input from a hose or upon removal of an end cap function as a screen.

In a further aspect the invention includes a method of utilizing a filter device on a suction side of a pump, drawing supply liquid through an end cap of the filter, removing an end cap from the filter device, and placing the filter device into a pool or source of liquid.

The disclosure includes utilizing a filter device on a suction side of a pump, placing the filter device into a pool or source of liquid to filter liquid, removing the filter device from the pool or source of liquid, and adding an end cap to the filter device to draw liquid through a supply hose. The filter device may also be utilized on a discharge side of the pump.

The above partial summary of the present invention is not intended to describe each illustrated embodiment, aspect, or every implementation of the present invention. The figures and detailed description and claims that follow more particularly exemplify these and other embodiments and further aspects of the invention.

Figure 1:
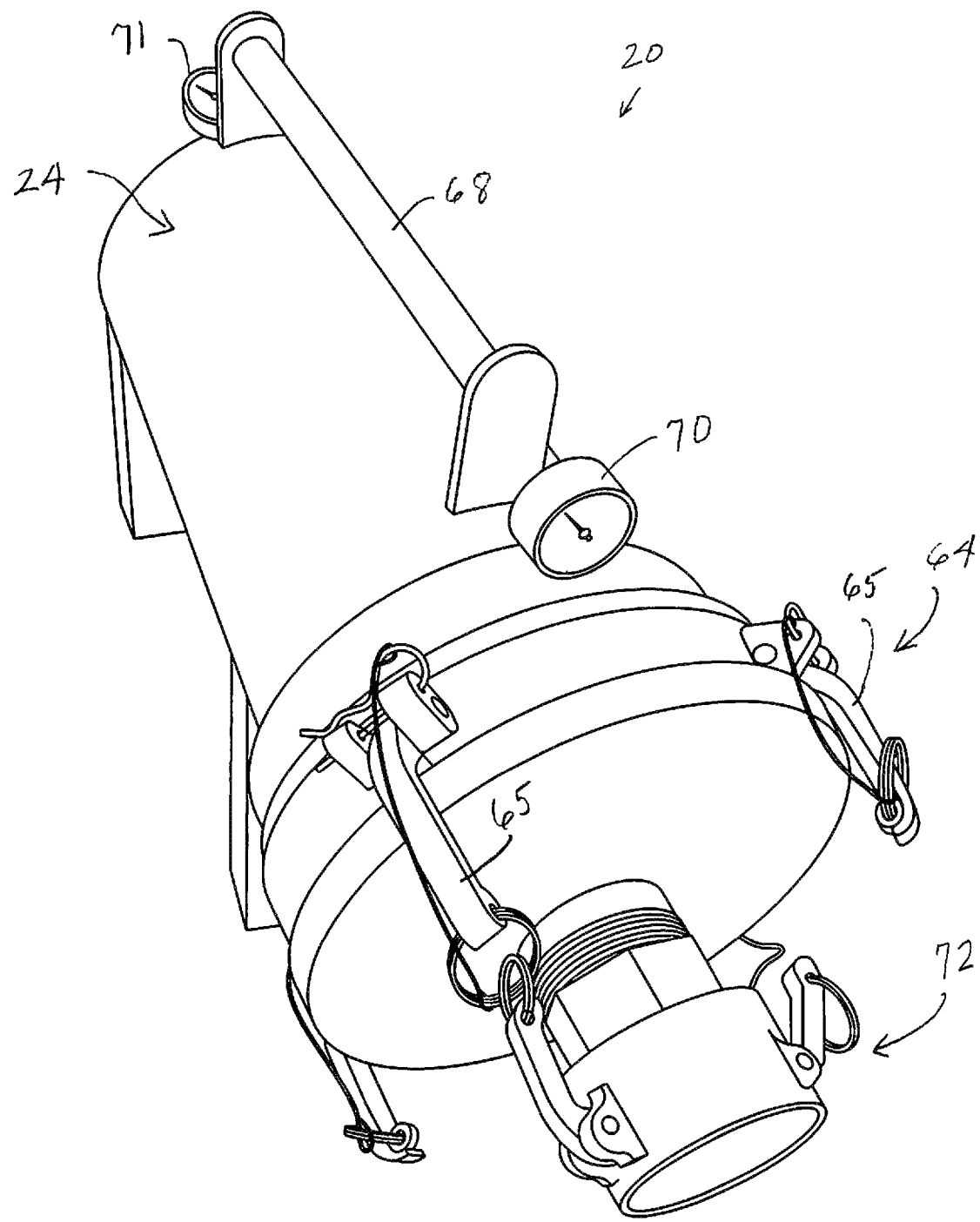
FIG. 1 is a perspective view of a filter device made in accordance with one aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Figure 2:
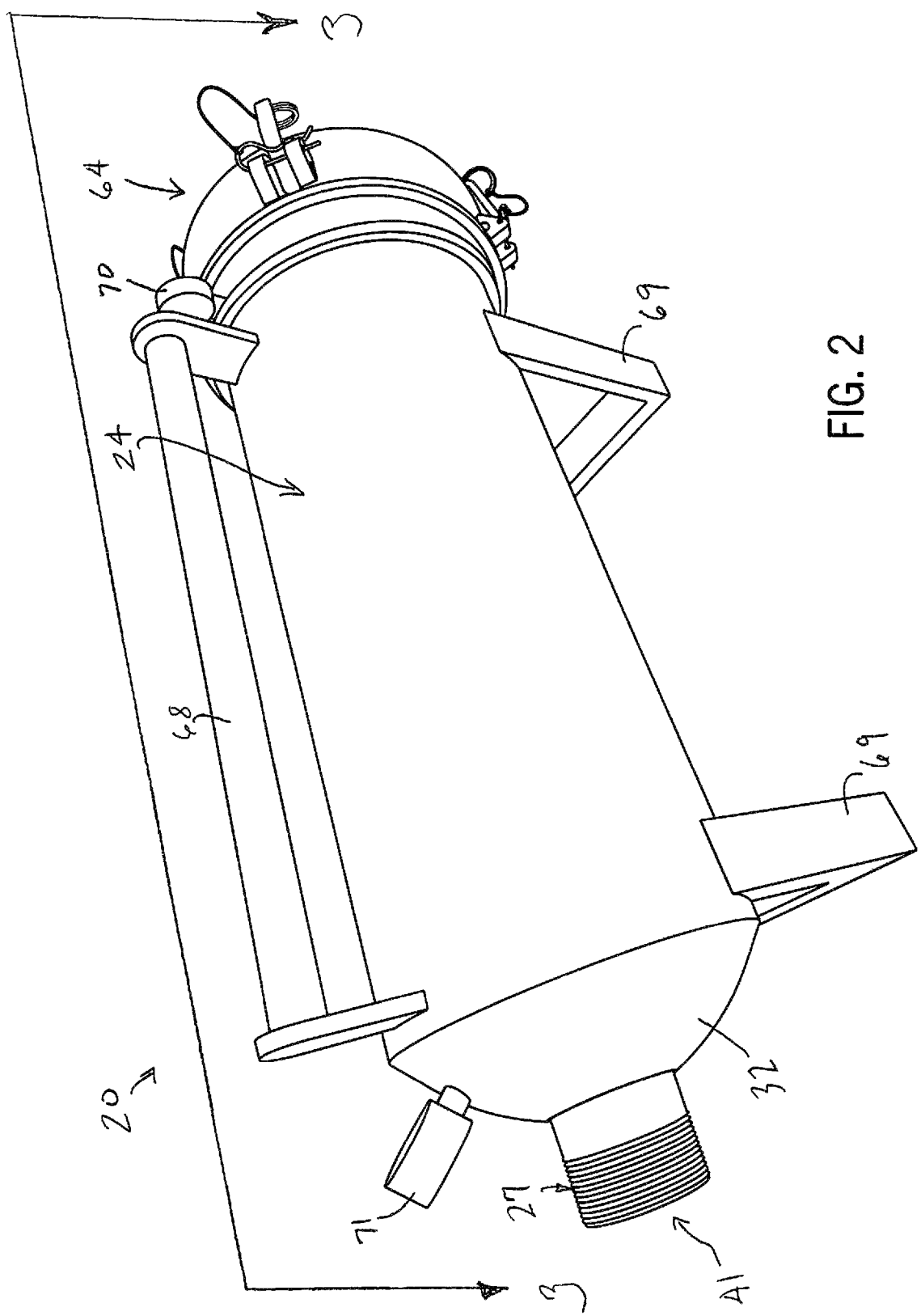
FIG. 2 is a further perspective view of the device shown in FIG. 1.
Figure 3:
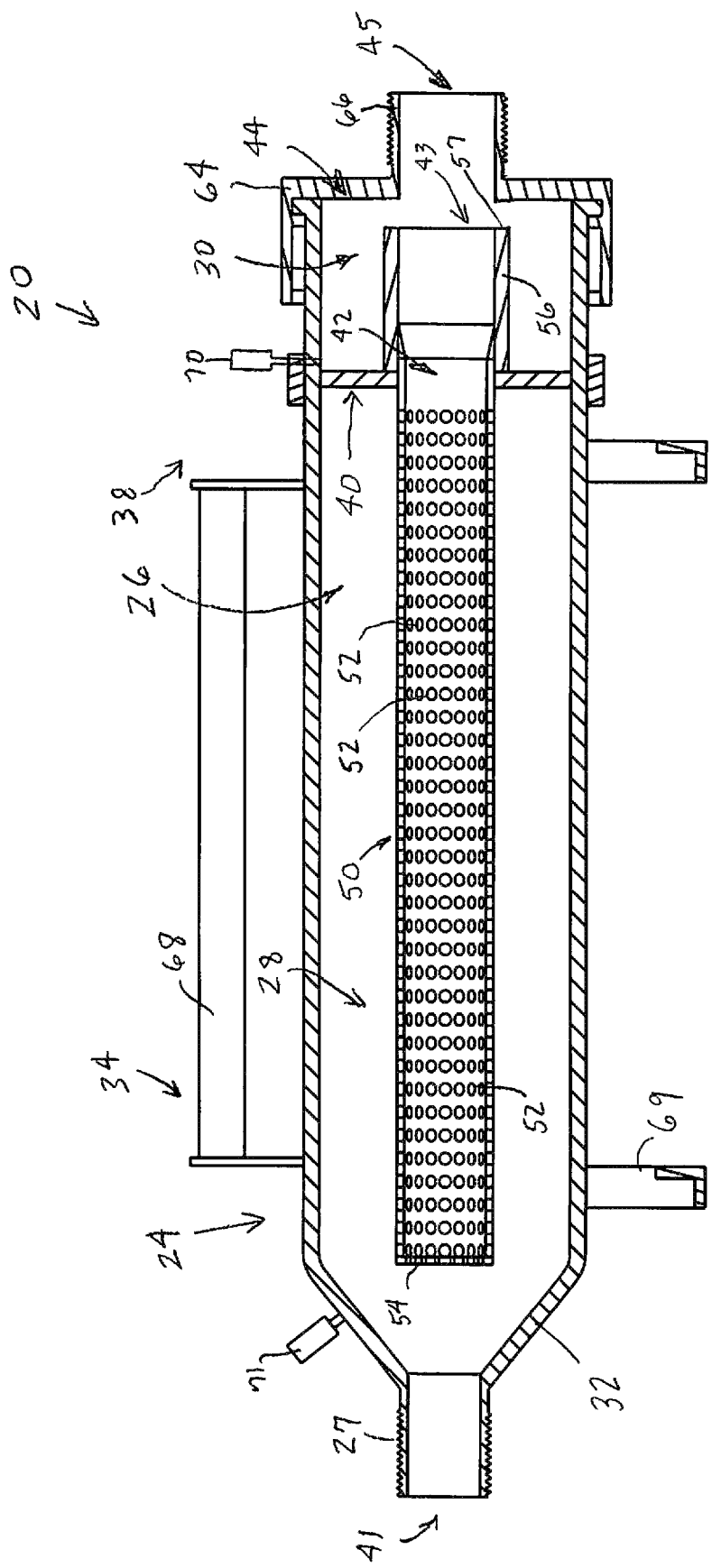
FIG. 3 is a section view taken along line 3-3 of FIG. 2.

Referring to FIGS. 1-10, aspects of the devices, systems and methods in accordance with the invention are shown. FIG. 1 and FIG. 2 are perspective views of a filter device 20. FIG. 3 is a section view taken along line 3-3 of FIG. 2. Device 20 includes a housing 24 which in this case is a cylindrical housing having an inner chamber 26. Housing 24 is made of metal, such as aluminum or steel, and in one instance is cylindrical. Other types of metal or other materials may be used to construct housing 24. A first end wall 32 is formed or positioned at a first end 34 of the device 20 and includes a first opening 41 in communication with the chamber 26. A baffle 40 is positioned at a second end 38 of the housing 24 and within the chamber 26. The baffle 40 includes a second opening 42 providing access into outlet sub-chamber 28. The first end wall 32, housing 24 and baffle 40 define the outlet sub-chamber 28. The baffle 40 and chamber 26 define at least in part an inlet sub-chamber 30. In one aspect housing 24 has an outer diameter of approximately 10 inches.

A cage 50 extends from the baffle 40 into the sub-chamber 28. The cage 50 includes perforations 52 to allow liquid to flow therethrough. In one instance the cage 50 is made from perforated sheet steel and rolled into a cylindrical shape and welded to itself along a longitudinal edge to hold its form. In one aspect cage 50 has a diameter of approximately 6 inches. The cage 50 is configured to receive a bag filter 60 therein. The bag filter receives liquid such as water such that matter contained within the liquid is retained as filtrides within the bag filter 60 while filtrate passes through the bag filter 60 and through the cage 50 and into the balance of outlet sub-chamber 28 and passes through the first opening 41. In further aspects the baffle 40 seals the inlet chamber from the outlet sub-chamber 28 yet allows communication via the single second opening 42. In further aspects the baffle 40 is ring shaped. In some aspects the cage 50 has an outer diameter greater than a diameter of the second opening 42.

Figure 4:
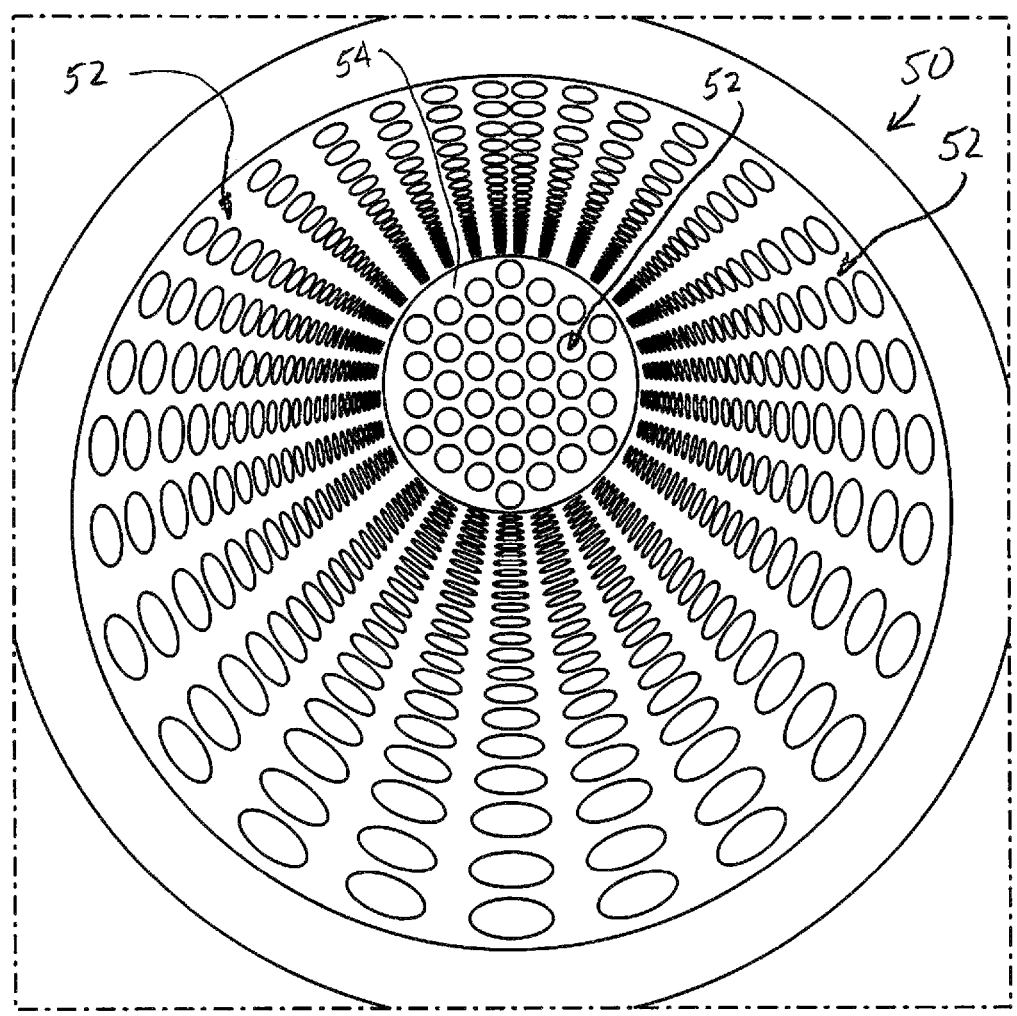
FIG. 4 is a partial front view with portions removed for clarity to reveal features of the filter device of FIG. 1.

FIG. 4 is a partial front view of the device 20 looking into the cage 50 which shows cage end wall 54 also including perforations 52. The cage 50 is connected to the baffle 40 and extends into the outlet sub-chamber 28. In one aspect, the connection of the cage 50 at the baffle 40 is the sole location of connection of the cage 50. In such case, no support struts or reinforcement structures are used or needed to maintain cage 50 in a suspended orientation within chamber 28. The hosing 24 is oriented with its longitudinal length extending horizontally when positioned on a surface using legs 69. In this manner, cage 50 is also oriented with its longitudinal length oriented horizontally. In this manner, liquid which enters the filter device 20 into the cage 50 is transported in-line along the longitudinal length of the cage 50 and chamber 28 to exit the device 20 in-line through first opening 41.

Figure 5:
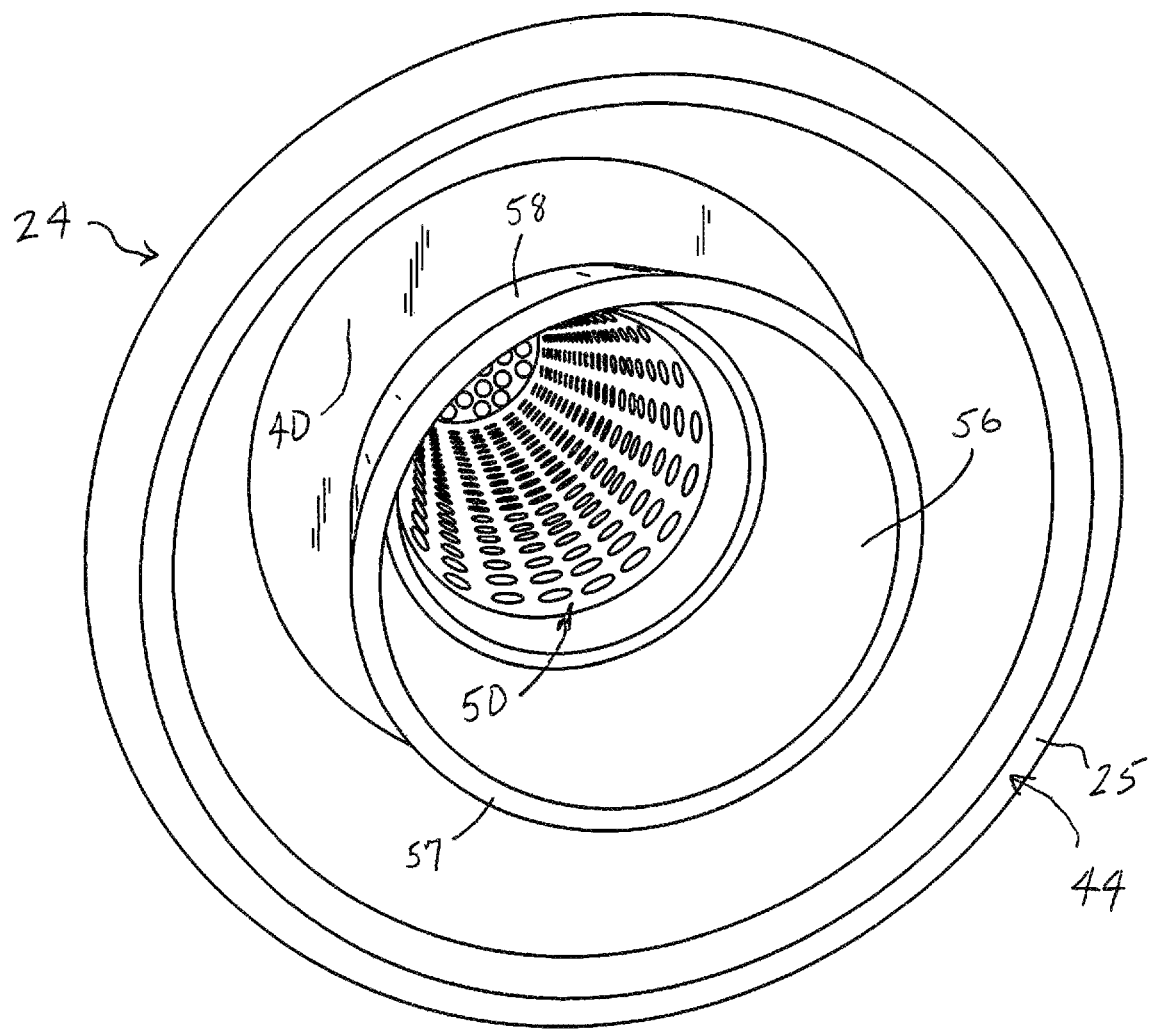
FIG. 5 is a partial perspective view of the device shown in FIG. 1 with portions removed for clarity.

FIG. 5 is a further partial perspective view of the device 20 and showing cage 50 visible through and/or positioned within second opening 42 of the baffle 40. Device 20 in one aspect also includes a collar 56 contained within the chamber 26 and extending from the baffle 40 away from the first end wall 32. Collar 56 extends away from cage 50 and into, or is positioned within, inlet sub-chamber 30 (See FIG. 3, for instance). Baffle 40 seals inlet sub-chamber 30 from outlet sub-chamber 28 such that the only access to the outlet sub-chamber 28 from the inlet sub-chamber 30 is via the second opening 42 and/or via the collar 56. In this instance, the collar 56 operates as the sole entry point into the cage 50 and sub-chamber 28. In some aspects the collar 56 is aligned with the cage 50; in other aspects, the collar 56 is an extension of the cage 50 yet without holes or perforations.

In further reference to FIGS. 1-3, device 20 includes an end cap 64 positioned at the second end 38 of the housing 24. Cam lock arms 65 and accompanying cam lock mechanisms are used to lock end cap 64 onto housing 24. The cam is activated to connect with associated groove or grooves on the housing 24. End cap 64 seals the fourth opening 44 defined by the housing 24. In one aspect end cap 64 contacts against terminal edge 25 of hosing 24 to create a seal. In one aspect the baffle 40, housing 24 and end cap 64 define inlet sub-chamber 30. End cap 64 includes a nozzle 66 and in aspects includes threads to receive additional components, such as a nozzle fitting 72 as shown in FIG. 1. Nozzle fitting 72 may include cam lock arms for quick connect of a hose, conduit or other component. Nozzle fitting 72 may be turned onto the threads of nozzle 66 and tightened with a wrench or other tool. In some aspects and applications, end cap 64 is optional as noted below.

Figure 6:
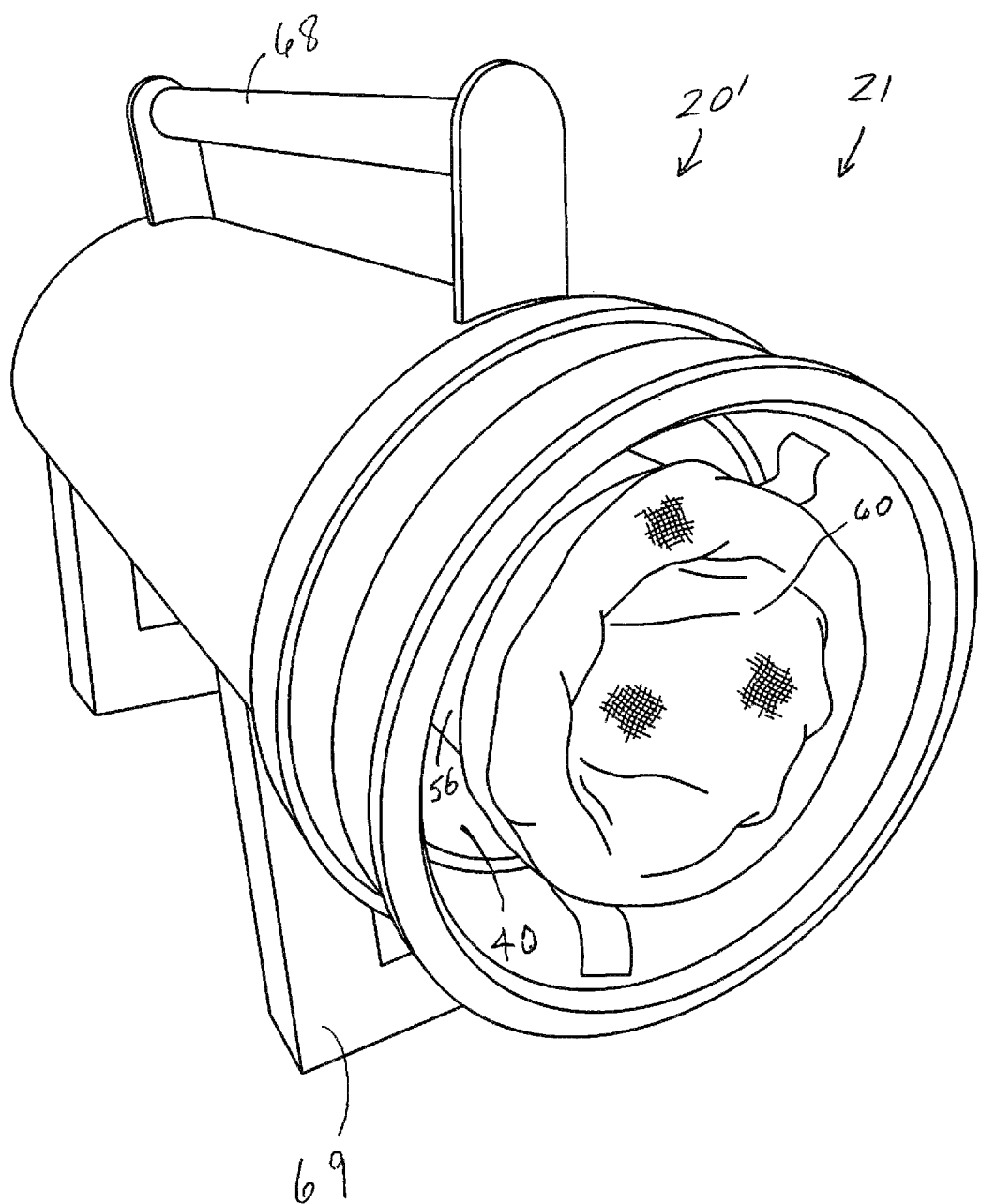
FIG. 6 is a further perspective view of the filter device of FIG. 1 with portions removed for clarity.
Figure 7:
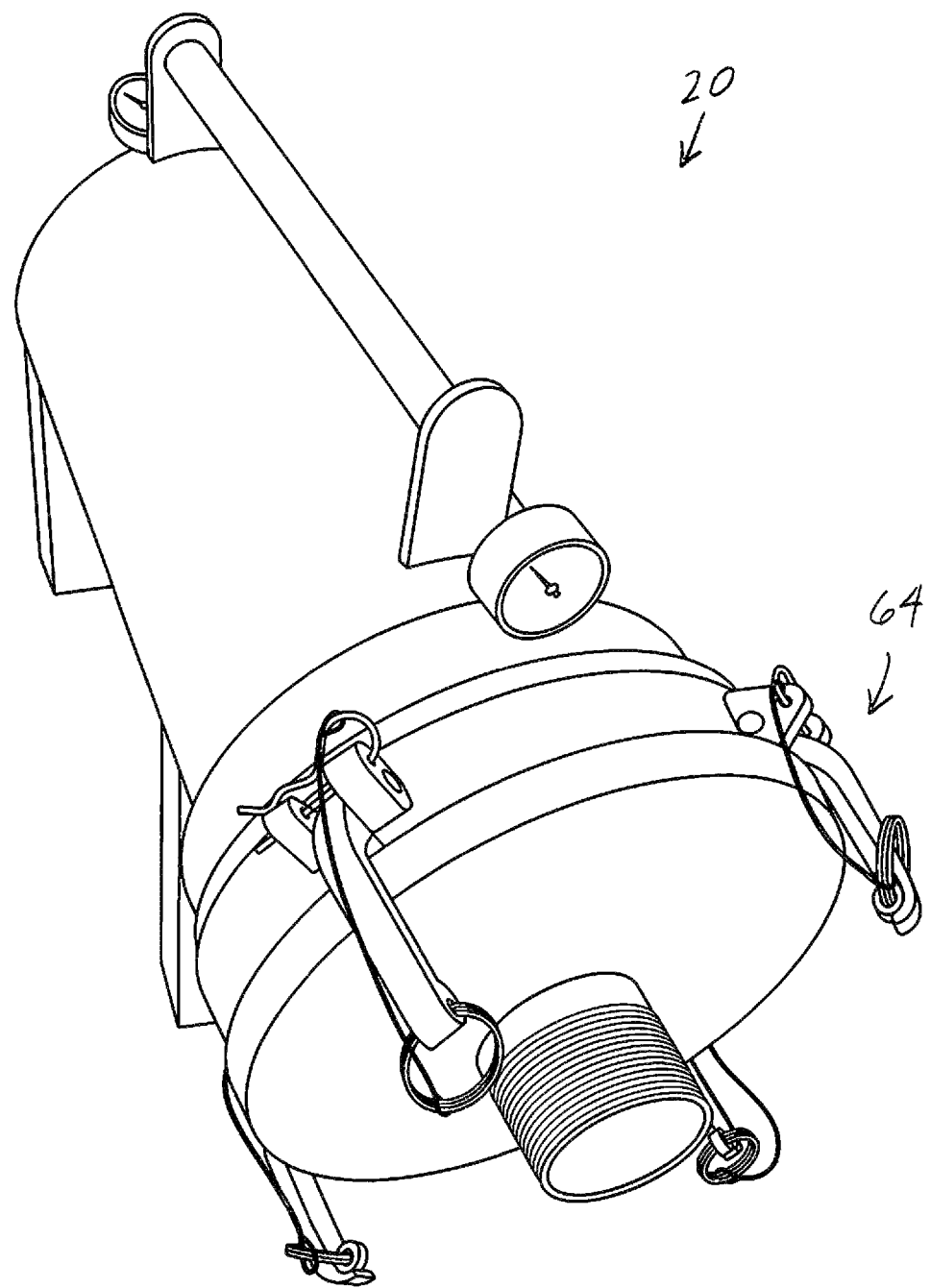
FIG. 7 is a further perspective view of the filter device of FIG. 1 with portion removed for clarity.

FIG. 6 is a perspective view of a device 20', system 21 and in accordance with method aspects of the invention. Device 20' in one aspect is identical to device 20 without an end cap 64. Both device 20, 20' may include a filter bag 60, which when filed, is replaced with another filter bag 60. In one aspect, filter bag 60 is a commonly available, standard size #2 bag having a diameter of about 6 inches and a length of about 34 inches. Such filter bag is a high-volume filter capable of filtering water up to 300 gallons of liquid per minute. The filter bag 60 holds approximately 17 pounds of filtrides or sediment. Cage 50 is constructed to hold the filter bag 60 in the generally horizontal orientation as shown, even when the filter is filled with sediment or filtrides. The filter bag 60 is positioned within the cage 50 and extends to or toward cage end wall 54. The filter bag 60 has a diameter of approximately 6 inches in one aspect. In one aspect, the cage 50 has a diameter of approximately 6 inches. In other aspects the filter bag 60 will have a size of 7-1/16 inched in diameter with a length of 32 inches. A cage 50 and device 20 may have dimensions corresponding to receive such filter bag 60. Other dimensions of filter bags and devices are contemplated. The filter bag 60 includes an upper portion which is folded over the terminal edge 57 of collar 56 and wrapped back upon the external surface 58 of the collar 56. A hose clamp, cable, cord, tie, twine, binder, bungee, zip tie or other fastener is wrapped around the filter bag 60 and collar 56 to secure the filter bag 60 into position generally as shown in FIG. 6. Securing the filter bag 60 to the collar 56 prevents the upper portion of the filter bag 60 from being forced into the cage 50 and outlet sub-chamber 28.

When the filter bag 60 is positioned within the cage 50 of the device 20 shown in FIGS. 1-3, and with end cap 64 secured into position, device 20 operates as a portable in-line liquid filter. For instance, in operation a conduit supplying liquid such as water is connected to the nozzle 66 of end cap 64 such that water flowing into device 20 is forced to travel into the filter bag 60 within cage 50. Filtrides within the water or liquid are retained within the filter bag 60 and cage 50, while filtrate passes through the perforations or openings 52 and exits at the first end 34 through nozzle 27. The filtered or clean water or liquid may travel through another conduit or be directed as desired. In an alternative, the filter device 20 is connected to a suction conduit so that liquid is drawn outward from first opening 41, thereby suctioning liquid through the outlet chamber 28 and drawing liquid in through nozzle 66. A conduit may be connected from the nozzle 66 to a pool of dirty water to pump the water from the pool, thought filter device 20, and into a pump connected to nozzle 27. In one aspect nozzle 27 has a diameter of 3 inches. In one aspect first end wall 32 is a domed cap welded to housing or pipe 24.

In an alternative, with respect to FIG. 6, where there is no end cap 64, device 20' being equipped with a filter bag 60, is placed into a pool of water or other liquid source. The liquid flows into inlet sub-chamber 30. When a pump is connected to nozzle 27, the pump creates suction to draw the liquid from inlet chamber 30 into the filter bag 60 via collar 56. Filtrides from the inserted liquid are captured in the filter bag 60 within the cage 50 while filtrate passes the filter bag 60 and the cage 50 and exits the first opening 41. In this manner device 20' operates as a screen which is simply placed in a liquid source so that the pump may draw in (device 20' placed in line on the suction side of a pump) filtered water or liquids.

Device 20' may alternatively receive an end cap 64 so that a conduit may be attached to nozzle 66 and operated as noted above (by attaching device 20' in-line with either the suction or output side of a pump). Such versatility allows for more efficient dewatering of facilities.

Figure 8:
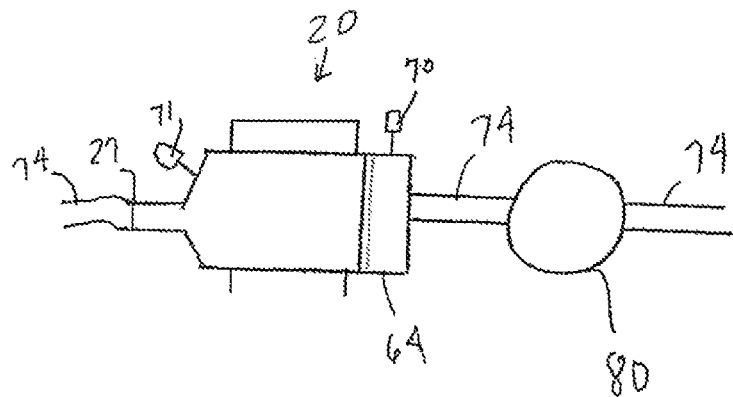
FIG. 8 is a schematic diagram of a filter device and system in accordance with a further aspect of the invention.

FIG. 8 shows filter device 20 used on a discharge side of a pump 80. Device 20, 20' includes a pressure gauge or gauges 70, 71. A hose 74 connects from pump 80 to the female fitting 72. Pump 80 draws water through a hose 74 on a suction side of the pump 80, such as from a pond or other water source. Water or liquid enters the end cap 64 and into the inlet chamber 30, passes into the filter bag 60 positioned in cage 50. Cage 50 holds the filter bag 60 horizontally and prevents the filter bag 60 from over-expanding which could otherwise cause the filter bag 60 to burst or tear. A pressure gauge 70 is positioned at housing 24 to read a pressure within inlet sub-chamber 30. When the pump 80 is first started, the filter bag 60 is clean or empty of sediment the gauge 70 will show a pressure reading equal to or nearly equal to a pressure reading shown at gauge 71 positioned at first end 34 of device 20. Gauge 71 reads a pressure within outlet sub-chamber 28. This pressure reading at an early stage will be a relatively low pressure because there is relatively small resistance within the filter bag 60. As the filter bag 60 fills with sediment, the gauge 70 will begin to read higher and the gauge 71 on the exit end 34 will start to read lower in pressure because less water is passing through the device 20. This arrangement will have the gauges 70, 71 reading positive pressure. The horizontal orientation of the filter bag 60 in-line with the inlet and outlet openings of the device allows for an efficient flow of the water.

Figure 9:
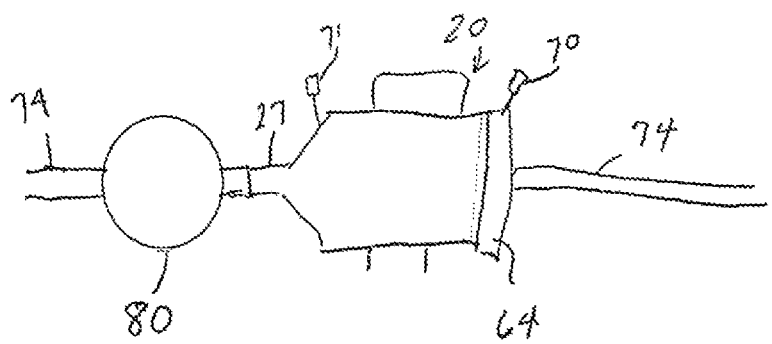
FIG. 9 is a schematic diagram of a filter device and system in accordance with a further aspect of the invention.
Figure 10:
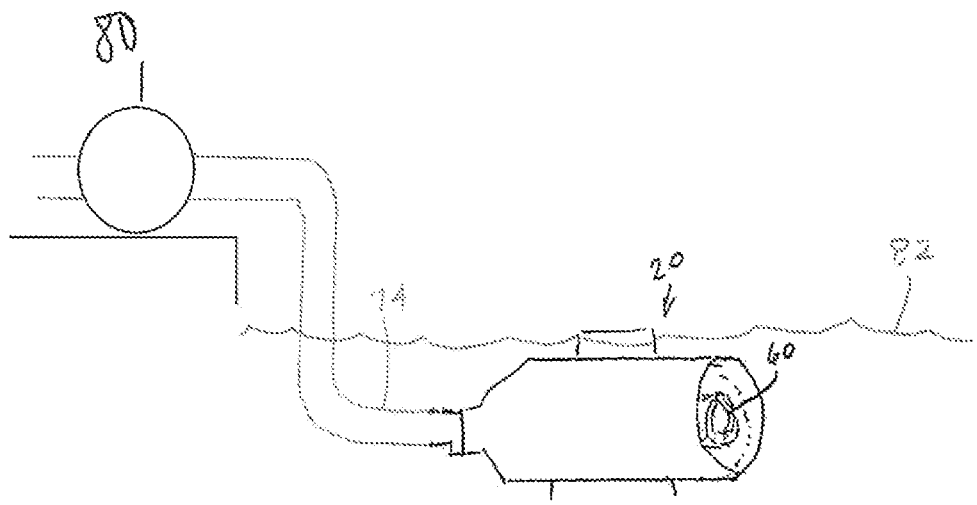
FIG. 10 is a schematic diagram of a filter device and system in accordance with a further aspect of the invention.

The device 20, 20' may be used on the suction side of the pump 80 in two different aspects as shown in FIG. 9 and FIG. 10. FIG. 9 shows filter device 20 placed inline on the suction side of the pump 80. Water travels through hose 74 and enters the end cap 64, passes through the filter bag 60, through the cage 50 and exits the nozzle 27. The gauges 70, 71 read negative pressure. Gauge 70 reads less and reads vacuum pressure as the filter bag 60 fills with sediment. The gauge 71 reads higher vacuum pressure as the pump 80 works harder to pull water through the clogging filter bag 60.

A second aspect as shown in FIG. 10 positions the filter device 20' on the suction side of the pump 80 and where there is no end cap 64. In one aspect, the end cap 64 of device 20 is removed to present the device 20' as shown in FIG. 6. In this aspect, the filter bag 60 is exposed, and the entire filter device 20' is set into a water hole or other water hole or other liquid source 82 and used as a suction intake screen. The hose 74 connects from the pump 80 to the female fitting on the exit end 34 of device 20. Water or liquid enters the inlet sub-chamber 30, enters the exposed filter bag, passes through the filter bag 60, through the cage 50 and into the suction hose 74 connected to the pump 80. Gauge 71 (or an additional gauge is placed on suction hose 74) to monitor the starting vacuum pressure. As the pressure climbs, and while monitored to reach a certain vacuum pressure representing a full or nearly full bag, the pumping action is stopped and the bag replaced with a clan filter bag 60.

The filter 20, 20' is an inline filter having very light weight so that a single person may carry the device. Device 20, 20' is used on either the suction or discharge side of the pump. The legs 69 allow device 20, 20' to be placed in a low profile and horizontal orientation within a pool or other liquid source to efficiently draw the water in-line through the device (and without undue elevation changes). The in-line orientation presents less turn or diversion of the passing liquid in order to maintain a high pressure flow. Multiple devices 20 may also be connected in-line for desired applications.

It should be understood, of course, that the foregoing relates to exemplary embodiments of the invention and that modifications may be made without departing from the spirit and scope of the invention as set forth in the following claims.

What is claimed is:

1. A device comprising:
   a housing defining a chamber;
   a first end wall positioned at a first end of the housing and having a first opening in communication with the chamber;
   a baffle positioned at a second end of the housing within the chamber and having a single second opening, the first end wall, housing and baffle defining a sub-chamber;
   a cage extending from the baffle into the sub-chamber, the cage having perforations to allow liquid to flow therethrough, the cage configured to receive a bag filter therein such that matter contained within liquid introduced through the second opening and into the bag filter is retained as filtrides within the bag filter while filtrate passes through the cage and the first opening; and a collar contained within the chamber and extending from the baffle away from the first end wall, the collar defining a third opening.

2. The device of claim 1, where the single second opening of the baffle is circular, and the cage is aligned with the second opening.

3. The device of claim 1 further comprising a filter bag positioned within the cage, a portion of the filter bag overlaying a terminal edge of the collar and a portion secured to an external surface of the collar.

4. The device of claim 1 further comprising a fourth opening at the second end of the housing to receive liquid into the chamber where liquid passes through the collar and into the sub-chamber.

5. The device of claim 1 further comprising a fourth opening at the second end of the housing and a detachably connected end cap positioned to cover a terminal edge of the fourth opening.

6. The device of claim 5 where the end cap includes a fifth opening, the fifth opening configured to receive a nozzle.

7. The device of claim 1 where the housing includes a cylindrical wall defining the chamber, the first end wall positioned at a first end of the cylindrical wall and having a first nozzle defining the first opening, the device further comprising a collar contained within the chamber and extending from the baffle away from the first end wall, the collar defining a third opening, and a bag filter positioned within the cage, a portion of the filter bag overlaying a terminal edge of the collar and a portion secured to an external surface of the collar, whereby placing the device in a pool of liquid and connecting the first nozzle to a suction side of a pump causes the liquid to enter the third opening where filtrides from the liquid are contained within the bag filter while filtrate of the liquid passes through the filter and through the cage and the first opening toward the pump.

8. A device comprising:
a housing defining a chamber;
a first end wall positioned at a first end of the housing and having a first opening in communication with the chamber;
a baffle positioned at a second end of the housing within the chamber and having a single second opening, the first end wall, housing and baffle defining a sub-chamber;
a cage extending from the baffle into the sub-chamber, the cage having perforations to allow liquid to flow therethrough, the cage configured to receive a bag filter therein such that matter contained within liquid introduced through the second opening and into the bag filter is retained as filtrides within the bag filter while filtrate passes through the cage and the first opening, the cage welded to the baffle, the baffle being a sole point of connection of the cage to the device.

9. The device of claim 1 further comprising a bag filter positioned within the cage, the bag filter configured such that matter contained within liquid introduced through the second opening and into the bag filter is retained as filtrides within the bag filter while filtrate passes through the bag filter and the cage and the first opening.

10. The device of claim 1 further comprising a detachably connected end cap positioned at the second end of the housing, the end cap having a surface area at least as great as a maximum opening at the second end.

11. The device of claim 1 further comprising a detachably connected end cap positioned at the second end of the housing, the end cap having a diameter greater than a maximum outer diameter of the baffle.

12. The device of claim 1 further comprising:
a bag filter positioned within the cage;
wherein the bag filter is visibly exposed when the device is connected to a suction side of a pump in a first operational screen mode; and
wherein the device further comprising an end cap and hose which conceals the bag filter in a second operational mode.

13. The device of claim 1 where the housing includes a cylindrical wall defining the chamber, the cage extending from the baffle, a liquid flow path extending from opposite the first opening and into the cage.

14. The device of claim 13 where the liquid flow path is defined in part by a collar contained within the chamber and extending from the baffle away from the cage.

15. The device of claim 1 where the housing includes an elongated cylindrical wall, the cage is elongated and has a longitudinal axis, the longitudinal axis oriented horizontally when the cylindrical wall is oriented along a horizontal surface.

16. The device of claim 1 where the cage is elongated, the device further comprises legs extending from the housing such that when the legs are positioned on a horizontal surface the elongated cage is oriented horizontally.

17. The device of claim 1 further comprising an inlet port, a central longitudinal axis defined by the inlet port and the first opening, a flow path oriented along the central longitudinal axis.

18. The device of claim 1 where the housing includes an elongated cylindrical wall, a handle oriented along a longitudinal axis of the cylindrical wall and connected to an upper side of the cylindrical wall.

19. A device comprising:
a housing having an elongated cylindrical wall and defining a chamber;
a handle oriented along a longitudinal axis of the cylindrical wall and connected to an upper side of the cylindrical wall;
a first end wall positioned at a first end of the housing and having a first opening in communication with the chamber;
a baffle positioned at a second end of the housing within the chamber and having a single second opening, the first end wall, housing and baffle defining a sub-chamber; a cage extending from the baffle into the sub-chamber, the cage having perforations to allow liquid to flow therethrough, the cage configured to receive a bag filter therein such that matter contained within liquid introduced through the second opening and into the bag filter is retained as filtrides within the bag filter while filtrate passes through the cage and the first opening, and further comprising legs connected to the cylindrical wall opposite the handle, a first pressure gauge configured to indicate pressure at the first end and a second pressure gauge configured to indicate pressure at the second end.

* * * * *